United States Patent
Tang et al.

(10) Patent No.: US 11,927,865 B2
(45) Date of Patent: Mar. 12, 2024

(54) ELECTROCHROMIC DEVICE WITH SIDE-BY-SIDE STRUCTURE AND APPLICATION THEREOF

(71) Applicant: WUYI UNIVERSITY, Jiangmen (CN)

(72) Inventors: Xiufeng Tang, Jiangmen (CN); Guoxin Chen, Jiangmen (CN); Yongxian Li, Jiangmen (CN); Zhixin Li, Jiangmen (CN); Zhaopeng Mo, Jiangmen (CN); Zhijun Ou, Jiangmen (CN); Tengcheng Huang, Jiangmen (CN); Lan Su, Jiangmen (CN); Zehui Zhang, Jiangmen (CN); Jianyi Luo, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 875 days.

(21) Appl. No.: 16/969,008

(22) PCT Filed: Jan. 7, 2019

(86) PCT No.: PCT/CN2019/070585
§ 371 (c)(1),
(2) Date: Aug. 11, 2020

(87) PCT Pub. No.: WO2020/133568
PCT Pub. Date: Jul. 2, 2020

(65) Prior Publication Data
US 2021/0026212 A1 Jan. 28, 2021

(30) Foreign Application Priority Data
Dec. 28, 2018 (CN) .......................... 201811619789.3

(51) Int. Cl.
*G02F 1/155* (2006.01)
*G02F 1/1523* (2019.01)

(52) U.S. Cl.
CPC ............ *G02F 1/155* (2013.01); *G02F 1/1525* (2013.01)

(58) Field of Classification Search
CPC ............................... G02F 1/155; G02F 1/1525
(Continued)

(56) References Cited

U.S. PATENT DOCUMENTS 5,754,329 A 5/1998 Coleman
2005/0084660 A1 4/2005 Kojima et al.

FOREIGN PATENT DOCUMENTS

CN 1496492 A 5/2004
CN 1639297 A 7/2005
(Continued)

OTHER PUBLICATIONS

International Search Report dated Sep. 27, 2019 for PCT/CN2019/070585.

*Primary Examiner* — William Choi
(74) *Attorney, Agent, or Firm* — Schmeiser, Olsen & Watts, LLP

(57) ABSTRACT

An electrochromic device with side-by-side structure including a common electrode unit, at least one color-changing unit and an electrolyte layer is provided. The common electrode unit includes an electrode layer and an electrode protection layer disposed on the electrode layer. The color-changing unit includes a transparent conductive layer and a color-changing layer disposed on the transparent conductive layer. The common electrode unit and each color-changing unit are arranged on the same plane with an insulating region between two adjacent units. The electrolyte layer covers and connects the electrode protection layer of the common electrode unit and the color-changing layer of each color-changing unit.

16 Claims, 7 Drawing Sheets

(58) Field of Classification Search
USPC .................................................. 359/265–275
See application file for complete search history.

(56) References Cited

FOREIGN PATENT DOCUMENTS

| | | | |
|---|---|---|---|
| CN | 202453619 U | 9/2012 | |
| CN | 105278199 A | 1/2016 | |
| CN | 209149026 U | 7/2019 | |
| WO | 98/57228 | 12/1998 | |
| WO | WO-03074627 A1 * | 9/2003 | ............ B82Y 10/00 |

* cited by examiner that the ability of optical modulation. An electrochromic device with a sandwich structure can be assembled by using electrochromic material as the core layer matched with the corresponding electrolyte layer and the electrode layer, which can be utilized in architectural assembly windows (also known as smart windows), displays, file encryption, color-changing glasses and other fields.

ELECTROCHROMIC DEVICE WITH SIDE-BY-SIDE STRUCTURE AND APPLICATION THEREOF

CROSS-REFERENCE TO RELATED APPLICATIONS

This application claims priority to PCT Application No. PCT/CN2019/070585 filed on Jan. 7, 2019, which claims priority to Chinese Patent Application No. 201811619789.3 filed on Dec. 28, 2018, the entire contents both of which are hereby incorporated by reference.

FIELD OF TECHNOLOGY

The following relates to the field of electrochromism and the field of electronic display, and more particularly, to an electrochromic device with side-by-side structure and its application.

BACKGROUND

Electrochromic material is a kind of intelligent material which can perform stable and reversible color changes under external electrical stimulation, and meanwhile has the ability of optical modulation. An electrochromic device with a sandwich structure can be assembled by using electrochromic material as the core layer matched with the corresponding electrolyte layer and the electrode layer, which can be utilized in architectural assembly windows (also known as smart windows), displays, file encryption, color-changing glasses and other fields.

SUMMARY

An aspect relates to an electrochromic device with side-by-side structure, which can facilitate the realization of multi-color and personalized graphic design of the electrochromic device, reduce the difficulty of device integration, softening and large area design. And the electrochromic device has a simple structure and low cost, which may greatly promote its widespread application.

The technical solution adopted in embodiments is as follows:

An electrochromic device with side-by-side structure, which includes a common electrode unit, at least one color-changing unit and an electrolyte layer; the common electrode unit includes an electrode layer, an electrode protection layer disposed on the electrode layer; the color-changing unit includes a transparent conductive layer and a color-changing layer disposed on the transparent conductive layer; the common electrode unit and each color-changing unit are arranged on the same plane with an insulating region between two adjacent units; the electrolyte layer covers the electrode protection layer of the common electrode unit and the color-changing layer of each color-changing unit, and connects the electrode protection layer of the common electrode unit and the color-changing layer of each color-changing unit.

Furthermore, when the electrochromic device with side-by-side structure is working, a working voltage is applied between the electrode layer of the common electrode unit and the transparent conductive layer of at least one color-changing unit to achieve color change of the color-changing layer of the at least one color-changing unit; alternatively, a working voltage is applied between the transparent conductive layers of at least two color-changing units to achieve color change switching between the color-changing layers of the at least two color-changing units. In some embodiments, the common electrode unit further includes a substrate and the electrode layer is disposed on the substrate; the color-changing unit further includes a transparent substrate and the transparent conductive layer is disposed on the transparent substrate.

In some embodiments, the substrate of the common electrode unit and the transparent substrate of each color-changing unit may share the same substrate to simplify the manufacturing process, or multiple substrates may be used separately to facilitate personalized splicing to form an overall device.

In some embodiments, the electrochromic device with side-by-side structure further includes a transparent encapsulation layer, and the transparent encapsulation layer covers the electrolyte layer to package and protect the device.

In some embodiments, in the common electrode unit, the electrode layer is partially covered by the electrode protection layer, and an uncovered area of the electrode layer is provided with a lead electrode electrically connected with the electrode layer; in the color-changing unit, the transparent conductive layer is partially covered by the color-changing layer, and an uncovered area of the transparent conductive layer is provided with a lead electrode electrically connected with the transparent conductive layer; neither the lead electrode of the common electrode unit nor the lead electrode of each color-changing unit is in contact with the electrolyte layer. The lead electrodes are used to facilitate connection to an external circuit to provide a working voltage.

In some embodiments, the color-changing layer is made of an electrochromic material.

In some embodiments, the electrode protection layer is made of a material capable of blocking discoloration ions from bombarding the electrode layer.

Another aspect relates to an electrochromic apparatus, which includes at least one electrochromic device with side-by-side structure according to any one of the above.

In some embodiments, the electrochromic apparatus may be an electrochromic dimming window, a display device or an encryption device.

For better understanding and implementation, the present disclosure is described in detail below with reference to the accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
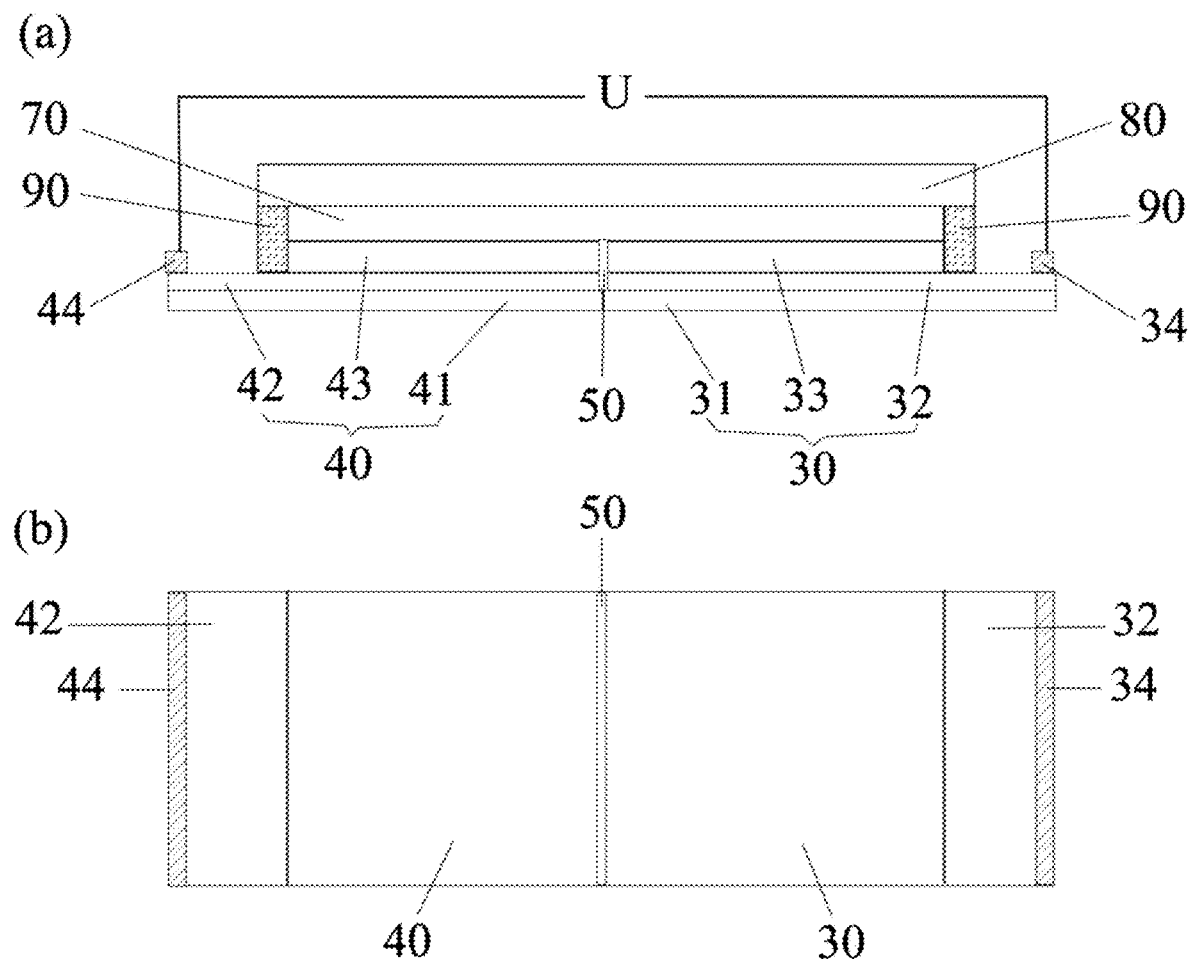
FIG. 1 is a schematic diagram of an electrochromic device with side-by-side structure according to Embodiment 1.

The conventional electrochromic device is a sandwich structure similar to a battery integrated with a variety of materials, including a transparent conductive layer on upper and lower glass substrates respectively, an ion storage layer, an electrochromic layer and an electrolyte layer. Its working process usually includes the following two steps: (1) the process of applying a forward working voltage between the upper and lower transparent conductive layers, the cations in the electrolyte layer are injected into the color-changing layer, and the color-changing layer is colored; (2) the process of applying a reverse working voltage between the upper and lower transparent conductive layers, the cations are separated from the color-changing layer, and the color-changing layer fades.

However, in conventional electrochromic devices, the injection and extraction of cations are performed vertically, while the ion storage layer and the color-changing layer are located on different functional layers in vertical direction. Therefore, the colors and positions of the two must be matched to enable the color-changing layer to show its own color or color change, which greatly limits the diversity and personalized color design of electrochromic devices, and it is not easy to integrate and soften the devices. Moreover, the complicated manufacturing process and high cost have greatly affected the large-scale commercial application of conventional electrochromic devices.

The disclosure is to flatten the current sandwich-structured electrochromic device into a side-by-side structure electrochromic device, so as to facilitate the realization of multi-color and personalized graphic design of the electrochromic device, reduce the difficulty of device integration, softening and large area design. And the electrochromic device with side-by-side structure provided by the disclosure has a simpler structure and lower cost, which may greatly promote its widespread application.

The electrochromic device with side-by-side structure of the disclosure includes a common electrode unit, at least one color-changing unit, and an electrolyte layer. The common electrode unit includes an electrode layer and an electrode protection layer disposed on the electrode layer. The color-changing unit includes a transparent conductive layer and a color-changing layer disposed on the transparent conductive layer. The common electrode unit and each color-changing unit are arranged on the same plane with an insulation region between two adjacent units. The electrolyte layer covers the electrode protection layer of the common electrode unit and the color-changing layer of each color-changing unit, and connects the electrode protection layer of the common electrode unit and the color-changing layer of each color-changing unit. When the electrochromic device with side-by-side structure is working, a working voltage is applied between the electrode layer of the common electrode unit and the transparent conductive layer of at least one color-changing unit to achieve color change of the color-changing layer of the at least one color-changing unit; alternatively, a working voltage is applied between the transparent conductive layers of at least two color-changing units to achieve color change switching between the color-changing layers of the at least two color-changing units. Specifically, the common electrode unit further includes a substrate, and the electrode layer is disposed on the substrate. The substrate may be transparent, translucent or opaque, and is made of insulating materials such as glass, ceramics, plastics, etc. The electrode layer may be made of transparent or opaque conductive materials, such as an ITO conductive film ("ITO" is the abbreviation of "Indium tin oxide"), a metal film, and the like.

The color-changing unit further includes a transparent substrate, and the transparent conductive layer is disposed on the transparent substrate. The transparent substrate is made of a transparent insulating material such as glass, and the transparent conductive layer is made of a transparent conductive material, such as an ITO conductive film, etc.

As a further aspect, the substrate of the common electrode unit and the transparent substrate of each color-changing unit may be the same substrate, specifically the same glass substrate. On the glass substrate, the common electrode unit and its adjacent color-changing units are separated by an insulation region to avoid short circuit, and every adjacent two color-changing units are also separated by an insulation region to ensure that the color-changing layer in each color-changing unit is able to colored or faded independently.

In order to achieve package protection for the device, the electrochromic device with side-by-side structure further includes a transparent encapsulation layer, which covers the electrolyte layer and is made of a transparent insulating material such as glass.

In order to conveniently connect to an external circuit for a working voltage, in the common electrode unit, the electrode layer is partially covered by the electrode protection layer, and an uncovered area of the electrode layer is provided with a lead electrode electrically connected with the electrode layer; in the color-changing unit, the transparent conductive layer is partially covered by the color-changing layer, and an uncovered area of the transparent conductive layer is provided with a lead electrode electrically connected with the transparent conductive layer. Neither the lead electrode of the common electrode unit nor the lead electrode of each color-changing unit is in contact with the electrolyte layer.

Therefore, the electrochromic device with side-by-side structure has two working modes:

(1) Connect the lead electrode of the common electrode unit and the lead electrode of any one color-changing unit to an external circuit respectively, that is, apply a working voltage between the electrode layer of the common electrode unit and the transparent conductive layer of any one color-changing unit, to achieve coloring or fading of the color-changing layer in the color-changing unit; alternatively, connect the lead electrode of the common electrode unit and the lead electrodes of any two or more color-changing units to an external circuit respectively, that is, apply a working voltage between the electrode layer of the common electrode unit and the transparent conductive layers of two or more color-changing units, to realize simultaneous coloring or fading of the color-changing layers in the two or more color-changing units.

(2) Connect the lead electrodes of any two or more color-changing units to an external circuit respectively, that is, apply a working voltage between the lead electrodes of the two or more color-changing units, to achieve the switching of coloring or fading between the color-changing layers of the two or more color-changing units.

In order to better achieve package protection for the device, the electrochromic device with side-by-side structure further includes an adhesive. The adhesive is in a gap between the transparent encapsulation layer and the electrode layer, and/or is in a gap between the transparent encapsulation layer and the transparent conductive layers, to achieve packaging.

Specifically, the color-changing layer is made of an electrochromic material, which can be a tungsten oxide ($WO_3$) film, a nickel oxide (NiO) film, and so on.

The electrode protection layer is made of a material capable of blocking discoloration ions from bombarding the electrode layer, such as a transparent titanium dioxide ($TiO_2$) film, can also transmit light, or can be a color-changing material. The electrode protection layer may also be an ion storage layer to protect the electrode layer and play a role of storing ions.

The electrolyte layer is a gel electrolyte layer, a fully solid-state electrolyte layer, or a liquid electrolyte layer, such as a propylene carbonate (PC) solution of lithium perchlorate ($LiClO_4$), a hydrochloric acid aqueous solution, and so on.

The electrochromic device with side-by-side structure of the disclosure may be applied in an electrochromic apparatus. The electrochromic apparatus includes at least one such electrochromic device with side-by-side structure, and the electrochromic apparatus may specifically be an electrochromic dimming window, a display or an encryption device.

The number of color-changing units in the electrochromic device with side-by-side structure is variable, and the arrangement of the common electrode unit and each color-changing unit on the same plane is alterable too, depending on the actual display requirement.

In the disclosure, the common electrode unit and the color-changing unit are arranged on the same plane, which flattens the electrochromic device with the conventional sandwich structure into an electrochromic device with side-by-side structure, that is, there is no function layer that affects its color display in the vertical direction of the color-changing layer. Therefore, the color-changing layer can show its own color or discolor without limitation of the material types of electrode protection layer and electrode layer. This expands the range of materials that may be used for the color-changing layer, and also facilitates the free selection of the materials for the electrode protection layer and the electrode layer. It is not necessarily to use transparent materials for the electrode protection layer, or to match the color of the color-changing layer. Therefore, the disclosure may realize the array arrangement of the existing color-changing materials on the same plane and merge them in the electrochromic device, so as to realize color static display and large area, multi-color and personalized customization of smart windows. The electrochromic device with side-by-side structure of the disclosure has a better application prospect in the fields of smart windows, displays, file encryption and the like. In addition, compared with the conventional electrochromic device with sandwich structure, the disclosure improves the integration of the device by flattening the device, which is beneficial to its flexible design, and the device has simple structure, low cost, energy saving which is friendly to environment.

Other aspects and advantages of the disclosure will become apparent from the following detailed description taken in conjunction with the specific embodiments and accompanying drawings. It should be understood that the specific embodiments described herein are only used to explain the disclosure and are not intended to limit the scope. In addition, the technical features involved in the various embodiments of the disclosure described below can be combined with each other as long as no conflict.

Embodiment 1

FIG. 1 is a schematic diagram of the electrochromic device with side-by-side structure of this embodiment, wherein: FIG. 1(a) is a front view of the electrochromic device with side-by-side structure of this embodiment, and FIG. 1(b) is a top view of the electrochromic device with side-by-side structure of this embodiment.

The side-by-side electrochromic device of this embodiment includes a common electrode unit 40, a color-changing unit 30, an electrolyte layer 70, a transparent encapsulation layer 80, and an adhesive 90.

The common electrode unit 40 includes a substrate 41, an electrode layer 42 completely covering the substrate 41 and an electrode protection layer 43 disposed on the electrode layer 42. The electrode protective layer 43 covers one side of the electrode layer 42, and a lead electrode 44 is disposed on an uncovered area on the other side of the electrode layer 42.

The color-changing unit 30 includes a transparent substrate 31, a transparent conductive layer 32 covering the transparent substrate 31 and a color-changing layer 33 disposed on the transparent conductive layer 32. The color-changing layer 33 covers one side of the transparent conductive layer 32, and a lead electrode 34 is disposed on an uncovered area on the other side of the transparent conductive layer 32.

The common electrode unit 40 and the color-changing unit 30 are arranged side by side on the same plane, and an insulation region 50 is disposed between the two. The lead electrode 44 of the common electrode unit 40 and the lead electrode 34 of the color-changing unit 30 are respectively located on two sides of the insulation region 50.

The electrolyte layer 70 covers the electrode protective layer 43 of the common electrode unit 40 and the color-changing layer 33 of the color-changing unit 30, and connects the electrode protection layer 43 and the color-changing layer 33. Moreover, neither the wire electrode 44 of the common electrode unit 40 nor the wire electrode 34 of the color-changing unit 30 is in contact with the electrolyte layer 70.

The transparent encapsulation layer 80 covers the electrolyte layer 70.

The adhesive 90 is disposed in a gap between the transparent encapsulation layer 80 and the electrode layer 42, and is disposed in a gap between the transparent encapsulation layer 80 and the transparent conductive layer 32 to achieve packaging.

The substrate 41 of the common electrode unit 40 and the transparent substrate 31 of the color-changing unit 30 are two glass substrates respectively. The electrode layer 42 is an ITO conductive film sputtered on the substrate 41. The electrode protective layer 43 is a transparent $TiO_2$ film prepared by a sol-gel method. The transparent conductive layer 32 is an ITO conductive film sputtered on the transparent substrate 31. The color-changing layer 33 is a $WO_3$ film prepared by a thermal evaporation method, which is a cathodically coloring electrochromic material.

The electrolyte layer 70 is made of a PC solution of $LiClO_4$.

Figure 2:
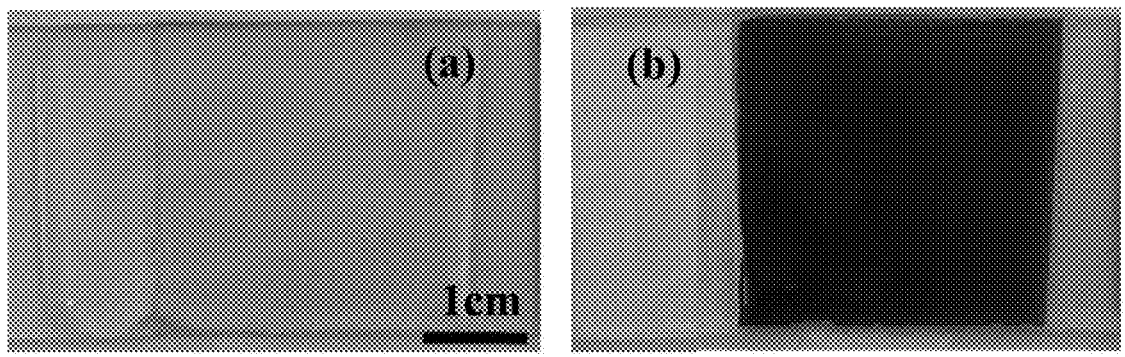
FIG. 2 is a pair of photos of two different states of the electrochromic device with side-by-side structure according to Embodiment 1 in operation.

Please refer to FIG. 2, which is a pair of photos of two different states of the electrochromic device with side-by-side structure of this embodiment during operation, wherein: FIG. 2(a) is a photo when the color-changing layer 33 is in a transparent state, and FIG. 2(b) is a photo when the color-changing layer 33 is in a coloring state.

When the electrochromic device with side-by-side structure is working, the lead electrode 44 of the common electrode unit 40 and the lead electrode 34 of the color-changing unit 30 are connected to an external circuit respectively for a working voltage. Users' control process of the state of the color-changing layer 33 is as follows:

(1) When no working voltage is applied, the color-changing layer 33 is in an initial transparent state. As shown in FIG. 2(a), the color-changing layer 33 plays a role of light transmission.

(2) Connect a positive electrode of the external circuit to the lead electrode 44, and connect a negative electrode of the external circuit to the lead electrode 34, that is, apply a working voltage U of 1V from the electrode layer 42 to the transparent conductive layer 32, so that the color-changing layer 33 comes to be in the coloring state. After the working voltage is switched off, the coloring state of the color-changing layer 33 remains, as shown in FIG. 2(b), and the color-changing layer 33 realizes a color-changing and dimming function.

(3) Then connect the negative electrode of the external circuit to the lead electrode 44, and connect a positive electrode of the external circuit to the lead electrode 34, that is, apply a working voltage U in the direction from the transparent conductive layer 32 to the electrode layer 42, so that the color-changing layer 33 fades to the initial transparent state, as shown in FIG. 2(a). After the working voltage is switched off, the transparent state of the color-changing layer 33 remains and its light transmitting function is restored;

(4) Repeat steps (2) and (3) to switch the dimming function and the light transmission function of the color-changing layer 33.

The electrochromic device with side-by-side structure of this embodiment may be used as a basic unit in a smart window. The smart window includes at least one such electrochromic devices with side-by-side structure, and the electrochromic devices are spliced in an array.

Thus, by array splicing of multiple above electrochromic devices with side-by-side structure, an smart window with electrochromic dimming function can be produced for large area in low cost.

Embodiment 2

Figure 3:
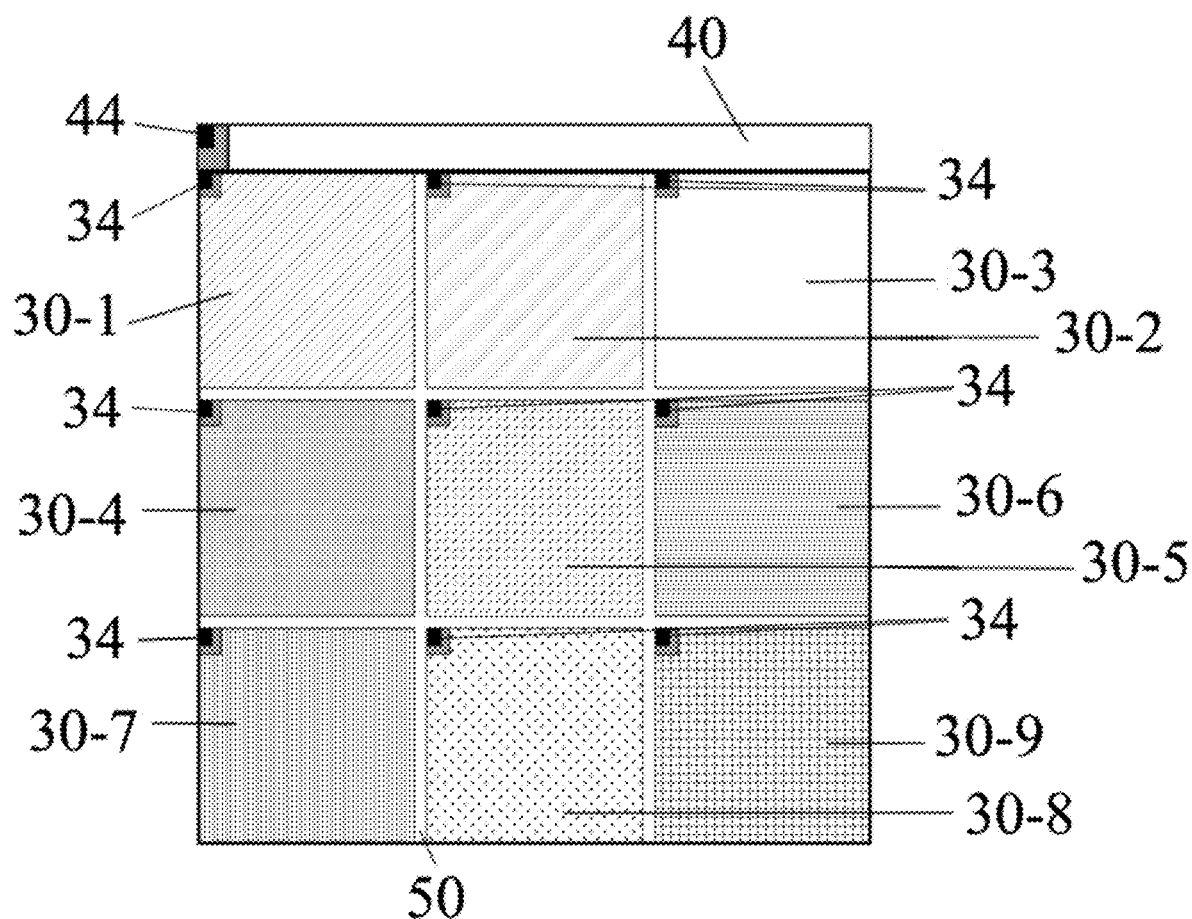
FIG. 3 is a top view of an electrochromic device with side-by-side structure according to Embodiment 2.

Please refer to FIG. 3, which is a top view of the electrochromic device with side by side structure of this embodiment.

The side-by-side electrochromic device with side by side structure of this embodiment includes a common electrode unit 40, nine color-changing units, an electrolyte layer, a transparent encapsulation layer, and an adhesive. The nine color-changing units are a color-changing unit 30-1, a color-changing unit 30-2, a color-changing unit 30-3, a color-changing unit 30-4, a color-changing unit 30-5, a color-changing unit 30-6, a color-changing unit 30-7, color-changing unit 30-8 and color-changing unit 30-9.

The common electrode unit 40 includes a rectangular substrate, an electrode layer completely covering the substrate, and an electrode protection layer disposed on the electrode layer. The electrode layer is partially covered by the electrode protection layer, leaving an uncovered area at one end of the electrode layer, and a lead electrode 44 is disposed on the uncovered area.

Each color-changing unit includes a square transparent substrate, a transparent conductive layer completely covering the transparent substrate, and a color-changing layer disposed on the transparent conductive layer. The transparent conductive layer is partially covered by the color-changing layer, leaving an uncovered area at one corner of the transparent conductive layer, and a lead electrode 34 is disposed on the uncovered area.

The common electrode unit 40 and nine color-changing units are arranged and spliced on the same plane, and the nine color-changing units are arranged in a 3×3 matrix and mechanically spliced into a square. The common electrode unit 40 is arranged along one edge of the square. An insulating region 50 is arranged between the common electrode unit 40 and three adjacent color-changing units, and is communicated between every two adjacent color-changing units. The electrolyte layer covers the electrode protection layer of the common electrode unit 40 and the color-changing layers of the nine color-changing units, and connects the electrode protection layer of the common electrode unit 40 and the color-changing layers of the nine color-changing units. Moreover, neither the lead electrode 44 of the common electrode unit 40 nor the lead electrodes 34 of the nine color-changing units are in contact with the electrolyte layer.

The transparent encapsulation layer covers the electrolyte layer, and exposes the lead electrode 44 of the common electrode unit 40 and the lead electrode 34 of each color-changing unit.

The adhesive is disposed in a gap between the transparent encapsulation layer and the electrode layer, and is disposed in gaps between the transparent encapsulation layer and the transparent conductive layers, for encapsulating.

The substrate of the common electrode unit 40 and the transparent substrate of the nine color-changing units share the same glass substrate. The electrode layer is a metal film sputtered on the glass substrate. The electrode protection layer is a transparent $TiO_2$ film prepared by a sol-gel method, the transparent conductive layer is an ITO conductive film sputtered on the glass substrate, and each color-changing layer is a $WO_3$ film or a NiO film prepared by a thermal evaporation method.

The materials and shapes of the color-changing layers of the nine color-changing units may be different from each other. Taking the color-changing unit 30-1 and the color-changing unit 30-2 as examples, the color-changing layer of the color-changing unit 30-1 is square and is a NiO film, which is black when coloring; the color-changing layer of the color-changing unit 30-2 is triangular and is a $WO_3$ film, which is blue when coloring.

The electrolyte layer is made of a PC solution of $LiClO_4$.

When the electrochromic device with side-by-side structure works, users may apply an working voltage between the electrode layer of the common electrode unit 40 and the transparent conductive layer of any of the color-changing units according to different material characteristics of each color-changing layer, to realize coloring or fading of the color-changing layer of the color-changing unit, so as to control the individual color-changing of a single color-changing unit; users may also apply a working voltage between the electrode layer of the common electrode unit 40 and the transparent conductive layers of the multiple color-changing units to realize simultaneous coloring of the color-changing layers of the multiple color-changing units, thereby to control the multiple color-changing units to present multi-colors or completely transparent; users may also apply a working voltage between the transparent conductive layers of any at least two color-changing units to switch coloring and fading between the color-changing layers of the color-changing units, so as to achieve color switching between the color-changing units.

Figure 4:
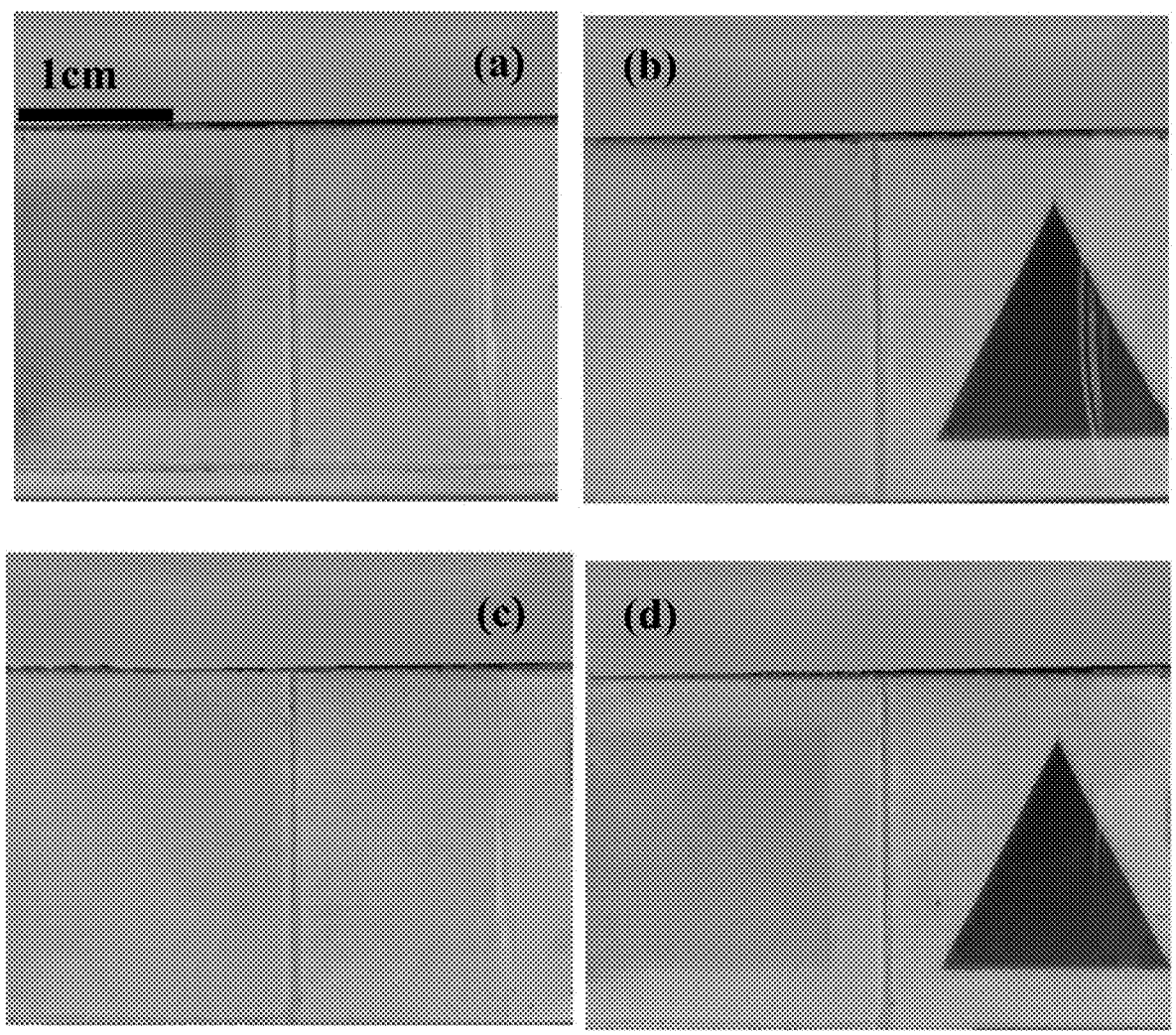
FIG. 4 is a set of photos of four different states of the electrochromic device with side-by-side structure according to Embodiment 2 in operation.

Please refer to FIG. 4, which is a set of photos of four different states of the electrochromic device with side-by-side structure of this embodiment during operation. Among them, FIG. 4(a) is a photo when the color-changing layer of the color-changing unit 30-1 is in a coloring state and the color-changing layer of the color-changing unit 30-2 is in a transparent state; FIG. 4(b) is a photo when the color-changing layer of color-changing unit 30-1 is in a transparent state and the color-changing layer of color-changing unit 30-2 is in a coloring state; FIG. 4(c) is a photo when the color-changing layers of the color-changing unit 30-1 and the color-changing unit 30-2 are both in a transparent state; FIG. 4(d) is a photo when the color-changing layers of the color-changing unit 30-1 and the color-changing unit 30-2 are both in a coloring state.

Taking the color-changing unit 30-1 and the color-changing unit 30-2 as examples, users may adjust the color-changing units 30-1 and the color-changing unit 30-2 to four different color state display combinations, and the control methods are as follows:

(1) When no working voltage is applied, the square color change layer of the color-changing unit 30-1 is in an initial black coloring state, and the triangular color-changing layer of the color-changing unit 30-2 is in an initial transparent state, as shown in FIG. 4 (a).

(2) Connect the negative electrode of the external circuit to the lead electrode 44 and the positive electrode of the external circuit to the lead electrode 34 of the color-changing unit 30-1, that is, apply a working voltage of 1V from the transparent conductive layer of the color-changing unit 30-1 to the electrode layer of the common electrode unit 40, so that the square color-changing layer of the color-changing unit 30-1 fades to the transparent state, and the triangular color-changing layer of the color-changing unit 30-2 is also in the transparent state, as shown in FIG. 4(c).

(3) Ground the lead electrode 44, connect the positive electrode of the external circuit to the lead electrode 34 of the color-changing unit 30-1, and connect the negative electrode of the external circuit to the lead electrode 34 of the color-changing unit 30-2, that is, apply a working voltage of 1V from the transparent conductive layer of the color-changing unit 30-1 to the transparent conductive layer of the color-changing unit 30-2, so that the square color-changing layer of the color-changing unit 30-1 fades to the transparent state, and the triangular color-changing layer of the color-changing unit 30-2 is in a blue coloring state, as shown in FIG. 4(b);

(4) Ground the lead electrode 44, connect the negative electrode of the external circuit to the lead electrode 34 of the color-changing unit 30-1, and connect the positive electrode of the external circuit to the lead electrode 34 of the color-changing unit 30-2, that is, apply an working voltage of 1V from the transparent conductive layer of the color-changing unit 30-2 to the transparent conductive layer of the color-changing unit 30-1, so that the square color-changing layer of the color-changing unit 30-1 is in the black coloring state, and the triangular color-changing layer of the color-changing unit 30-2 is in the blue coloring state, as shown in FIG. 4(d).

The electrochromic device with side-by-side structure of this embodiment may be used as a basic unit for array splicing, and then a multi-colored array smart window can be obtained. The multi-color array smart window includes at least one such electrochromic device with side-by-side structure.

Embodiment 3

Figure 5:
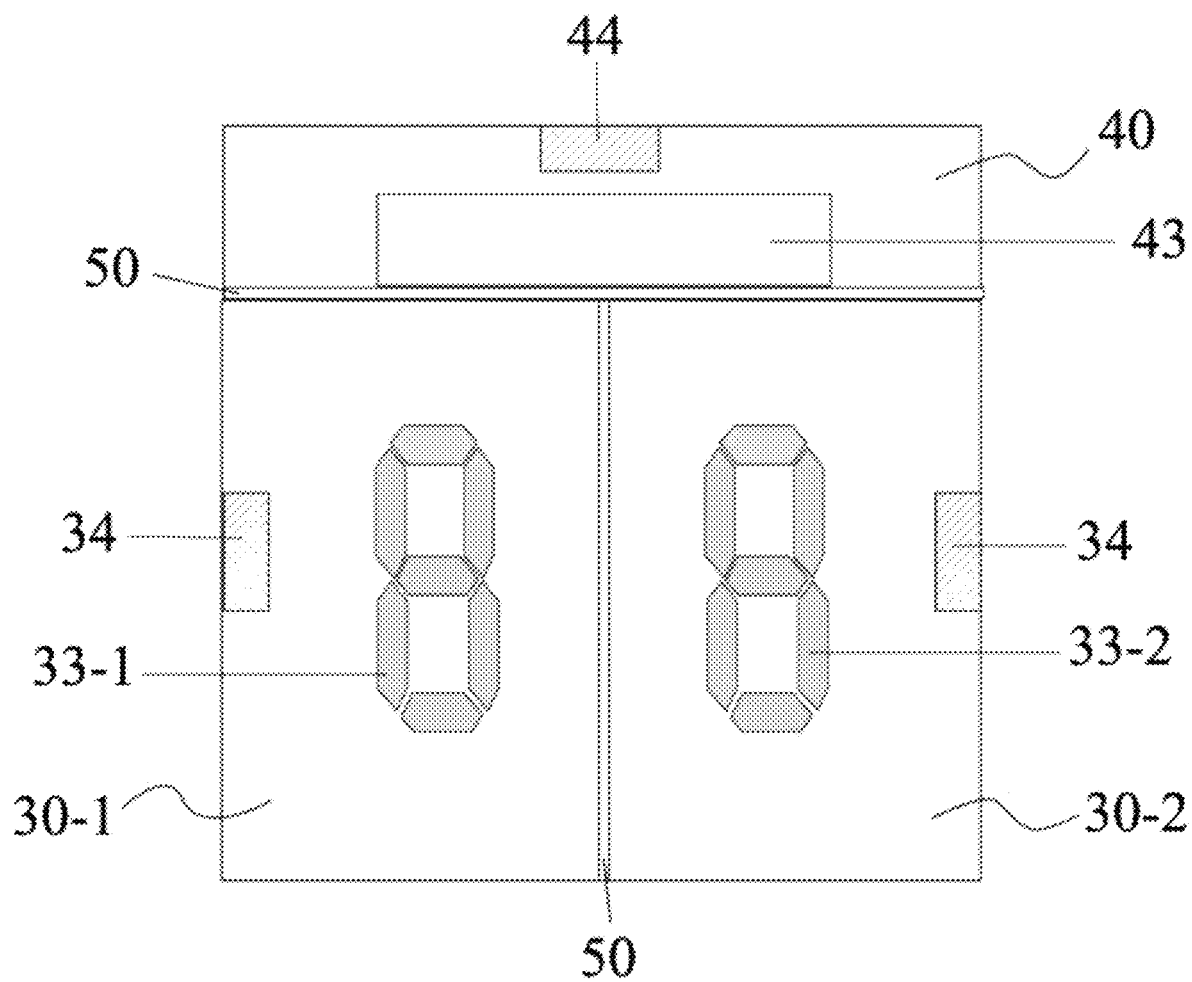
FIG. 5 is a top view of an electrochromic device with side-by-side structure according to Embodiment 3.

Please refer to FIG. 5, which is a top view of the electrochromic device with side-by-side structure of this embodiment;

The electrochromic device with side-by-side structure of this embodiment includes a common electrode unit 40, two color-changing units, an electrolyte layer, a transparent encapsulation layer, and an adhesive. The two color-changing units are a color-changing unit 30-1 and a color-changing unit 30-2, respectively.

The common electrode unit 40 includes a rectangular substrate, an electrode layer completely covering the substrate, and an electrode protection layer 43 disposed on the electrode layer. The electrode protection layer 43 covers a middle area of one side of the electrode layer, leaving an uncovered area surrounds the electrode protection layer 43. A lead electrode 44 is disposed on the middle of the uncovered area of the electrode layer.

Each color-changing unit includes a rectangular transparent substrate, a transparent conductive layer completely covering the transparent substrate, and a color-changing layer disposed on the transparent conductive layer. The color-changing layer is arranged in shape of number "8", covers a middle area of the transparent conductive layer, and a lead electrode 34 is disposed on an uncovered area of the transparent conductive layer.

The common electrode unit 40 and the two color-changing units are arranged and spliced on the same plane, and the two changing units are arranged side by side. The common electrode unit 40 is on one side of the two color-changing units. An insulating region 50 is arranged between the common electrode unit 40 and the two color-changing units, and is communicated between the two color-changing units.

The electrolyte layer covers the electrode protection layer 43 of the common electrode unit 40 and the color-changing layers of the two color-changing units, and connects the electrode protection layer of the common electrode unit 40 and the color-changing layers of the two color-changing units. Moreover, neither the lead electrode 44 of the common electrode unit 40 nor the lead electrodes 34 of the two color-changing units are in contact with the electrolyte layer.

The transparent encapsulation layer covers the electrolyte layer, and exposes the lead electrode 44 of the common electrode unit 40 and the lead electrodes 34 of the two color-changing units. The adhesive is disposed in a gap between the transparent encapsulation layer and the electrode layer, and is disposed in gaps between the transparent encapsulation layer and the transparent conductive layers, for encapsulating.

The substrate of the common electrode unit 40 and the transparent substrates of the two color-changing units are three glass substrates respectively. The electrode layer is an ITO conductive film sputtered on the substrate, the electrode protection layer 43 is a transparent $TiO_2$ film prepared by a sol-gel method, the transparent conductive layers of the two color-changing units are ITO conductive films sputtered on the transparent substrates, the color-changing layer 33-1 of the color-changing unit 30-1 is a NiO film prepared by a thermal evaporation method, and the color-changing layer 33-2 of the color-changing unit 30-2 is a $WO_3$ film prepared by a thermal evaporation method.

The electrolyte layer is made of a PC solution of $LiClO_4$.

Figure 6:
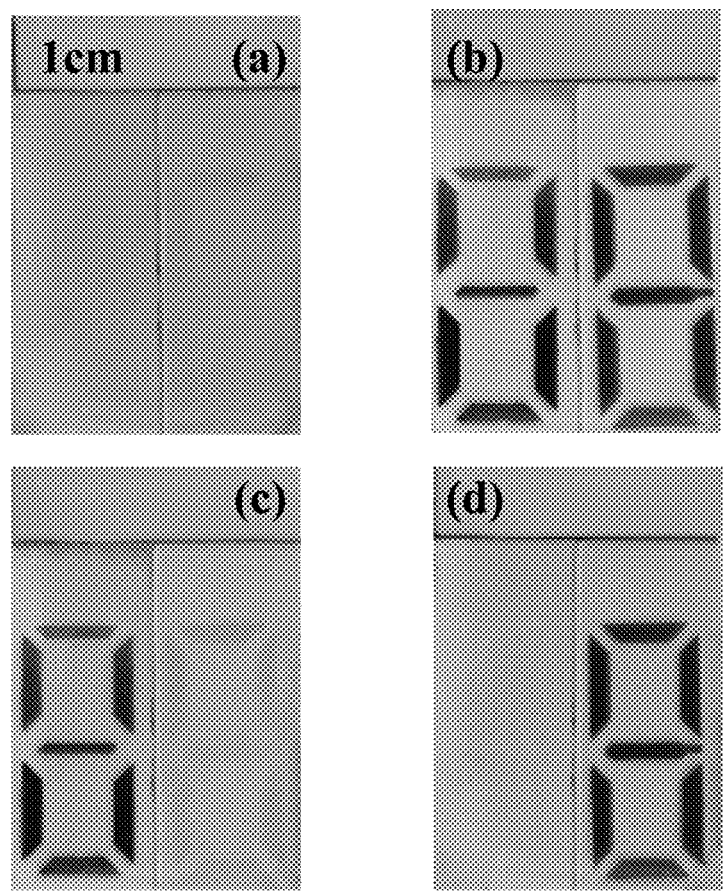
FIG. 6 is a set of photos of four different states of the electrochromic device with side-by-side structure according to Embodiment 3 in operation.

When the electrochromic device with side-by-side structure works, users may apply an working voltage between the electrode layer of the common electrode unit 40 and the transparent conductive layer of one of the color-changing units according to different material characteristics of each color-changing layer, to realize coloring or fading of the color-changing layer of the color-changing unit, so as to control the digital display of a single color-changing unit; users may also apply an working voltage between the transparent conductive layers of the two color-changing units to switch coloring and fading between the color-changing layers of the two color-changing units, so as to achieve digital display switching between the color-changing units. Please refer to FIG. 6, which is a set of photos of four different states of the electrochromic device with side-by-side structure of this embodiment during operation. Among them, FIG. 6(*a*) is a photo when the color-changing layer 33-1 and the color-changing layer 33-2 are both in a transparent state; FIG. 6(*c*) is a photo when the color-changing layer 33-1 is in a coloring state and the color-changing layer 33-2 is in a transparent state; FIG. 6(*d*) is a photo when the color-changing layer 30-1 is in a transparent state and the color-changing layer 30-2 is in a coloring state; FIG. 6(*b*) is a photo when the color-changing layer 33-1 and the color-changing layer 33-2 are both in a coloring state.

Users may adjust the color-changing unit 30-1 and the color-changing unit 30-2 to four different color state display combinations, and the control methods are as follows:

(1) When no working voltage is applied, the color-changing unit 33-1 is in an initial black coloring state and the number 8 is displayed, and the color-changing unit 33-2 is in an initial transparent state and does not display numbers, as shown in FIG. 6(*c*);

(2) Connect the negative electrode of the external circuit to the lead electrode 44 and the positive electrode of the external circuit to the lead electrode 34 of the color-changing unit 30-1, that is, apply a working voltage of 1~5 V from the transparent conductive layer of the color-changing unit 30-1 to the electrode layer of the common electrode unit 40, so that the color-changing layer 33-1 fades to a transparent state without displaying numbers, and the color-changing layer 33-2 is also in the transparent state without displaying numbers, as shown in FIG. 6(*a*);

(3) Ground the lead electrode 44, connect the positive electrode of the external circuit to the lead electrode 34 of the color-changing unit 30-1 and the negative electrode to the lead electrode 34 of the color-changing unit 30-2, that is, apply a working voltage of 1~5 V from the transparent conductive layer of the color-changing unit 30-1 to the transparent conductive layer of the color-changing unit 30-2, so that the color-changing layer 33-1 fades to the transparent state, and the color-changing layer 33-2 is coloring blue to display the number 8, as shown in FIG. 6(*d*);

(4) Ground the lead electrode 44, connect the negative electrode of the external circuit to the lead electrode 34 of the color-changing unit 30-1 and the positive electrode to the lead electrode 34 of the color-changing unit 30-2, that is, apply a working voltage of 1~5 V from the transparent conductive layer of the color-changing unit 30-2 to the transparent conductive layer of the color-changing unit 30-1, so that the color-changing layer 33-1 is coloring black to display the number 8, and the color-changing layer 33-2 is coloring blue to display the number 8, as shown in FIG. 6(*b*).

The electrochromic device with side-by-side structure of this embodiment may be used as a basic unit for array splicing, and then a color digital display can be obtained. The color digital display includes at least one such electrochromic device with side-by-side structure.

Thus, a large area of color digital static display can be realized by array splicing of a plurality of the electrochromic devices with side-by-side structure.

Embodiment 4

Figure 7:
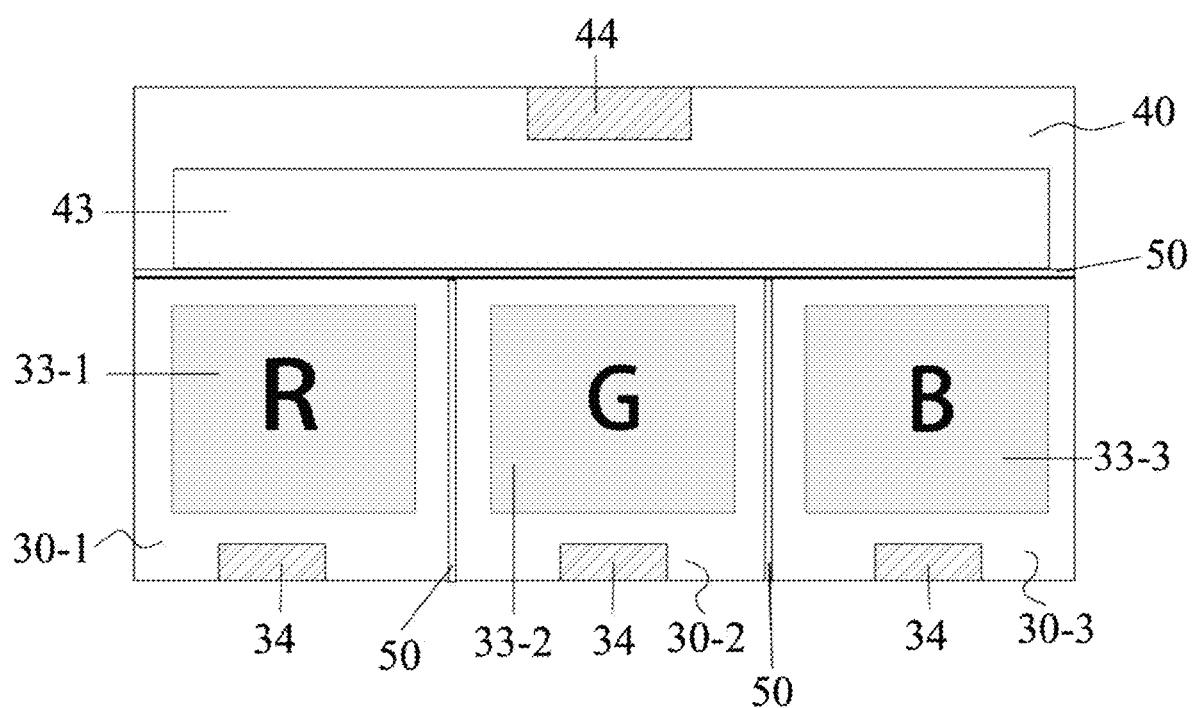
FIG. 7 is a top view of an electrochromic device with side-by-side structure according to Embodiment 4.

Please refer to FIG. 7, which is a top view of the electrochromic device with side by side structure of this embodiment.

The electrochromic device with side-by-side structure of this embodiment includes a common electrode unit 40, three color-changing units, an electrolyte layer, a transparent encapsulation layer, and an adhesive. The three color-changing units are a color-changing unit 30-1, a color-changing unit 30-2, and a color-changing unit 30-3, respectively.

The common electrode unit 40 includes a rectangular substrate, an electrode layer completely covering the substrate, and an electrode protection layer 43 disposed on the electrode layer. The electrode protection layer 43 covers a middle area of one side of the electrode layer, leaving an uncovered area surrounds the electrode protection layer 43. A lead electrode 44 is disposed on the middle of the uncovered area of the electrode layer.

Each color-changing unit includes a rectangular transparent substrate, a transparent conductive layer completely covering the transparent substrate, and a color-changing layer disposed on the transparent conductive layer. The color-changing layer is square and covers a middle area of the transparent conductive layer. A lead electrode 34 is disposed on an uncovered area of the transparent conductive layer.

The common electrode unit 40 and the three color-changing units are arranged and spliced on the same plane, and the three color-changing units are arranged side by side. The common electrode unit 40 is on one side of the three color-changing units. An insulating region 50 is arranged between the common electrode unit 40 and the three color-changing units, and is communicated between every two adjacent color-changing units.

The electrolyte layer covers the electrode protection layer 43 of the common electrode unit 40 and the color-changing layers of the three color-changing units, and connects the electrode protection layer 43 of the common electrode unit 40 and the color-changing layers of the three color-changing units. Moreover, neither the lead electrode 44 of the common electrode unit 40 nor the lead electrodes 34 of the three color-changing units are in contact with the electrolyte layer.

The transparent encapsulation layer covers the electrolyte layer, and exposes the lead electrode 44 of the common electrode unit 40 and the lead electrodes 34 of the three color-changing units. The adhesive is disposed in a gap between the transparent encapsulation layer and the electrode layer, and is disposed in gaps between the transparent encapsulation layer and the transparent conductive layers, for encapsulating.

The common electrode unit 40 and the three color-changing units share the same flexible ITO transparent conductive substrate, and the substrate of the flexible ITO transparent conductive substrate serves as the substrate of the common electrode unit 40 and the transparent substrates of the three color-changing units. The ITO conductive film of the flexible ITO transparent conductive substrate is divided into the electrode layer of the common electrode unit 40 and the transparent conductive layers of the three color-changing units, respectively.

The electrode protection layer 43 is a transparent $TiO_2$ film prepared by a sol-gel method. The color-changing layer 33-1 of the color-changing unit 30-1, the color-changing layer 33-2 of the color-changing unit 30-2, and the color-changing layer 33-3 of the color-changing unit 30-3 are all $WO_3$ films prepared by a thermal evaporation method.

The electrolyte layer is made of a hydrochloric acid aqueous solution with a mass concentration of 1%.

A color rendering plate is provided at the bottom of the electrochromic device with side-by-side structure of this embodiment. The color rendering plate has three primary color areas (red R, green G, and blue B). The R color area (red) is corresponding to the position of the color-changing layer 33-1, the G color area (green) is corresponding to the position of the color-changing layer 33-2, and the B area (blue) is corresponding to the position of the color-changing layer 33-3. When the color-changing layer is in a transparent state, the color area corresponding to the color-changing layer is displayed, and when the color-changing layer is in a coloring state, the color area corresponding to the color-changing layer is blocked out.

When the electrochromic device with side-by-side structure works, users can apply a working voltage between the electrode layer of the common electrode unit 40 and the transparent conductive layer of any at least one color-changing unit, thereby realizing the coloring or fading of the color-changing layer of the color-changing unit, so as to control the display of the corresponding color area; it is also possible to apply a working voltage between the transparent conductive layers of any at least two color-changing units to switch coloring and fading between the color-changing layers of the at least two color-changing units, so as to realize the display switching of the corresponding color areas between the color-changing units.

Figure 8:
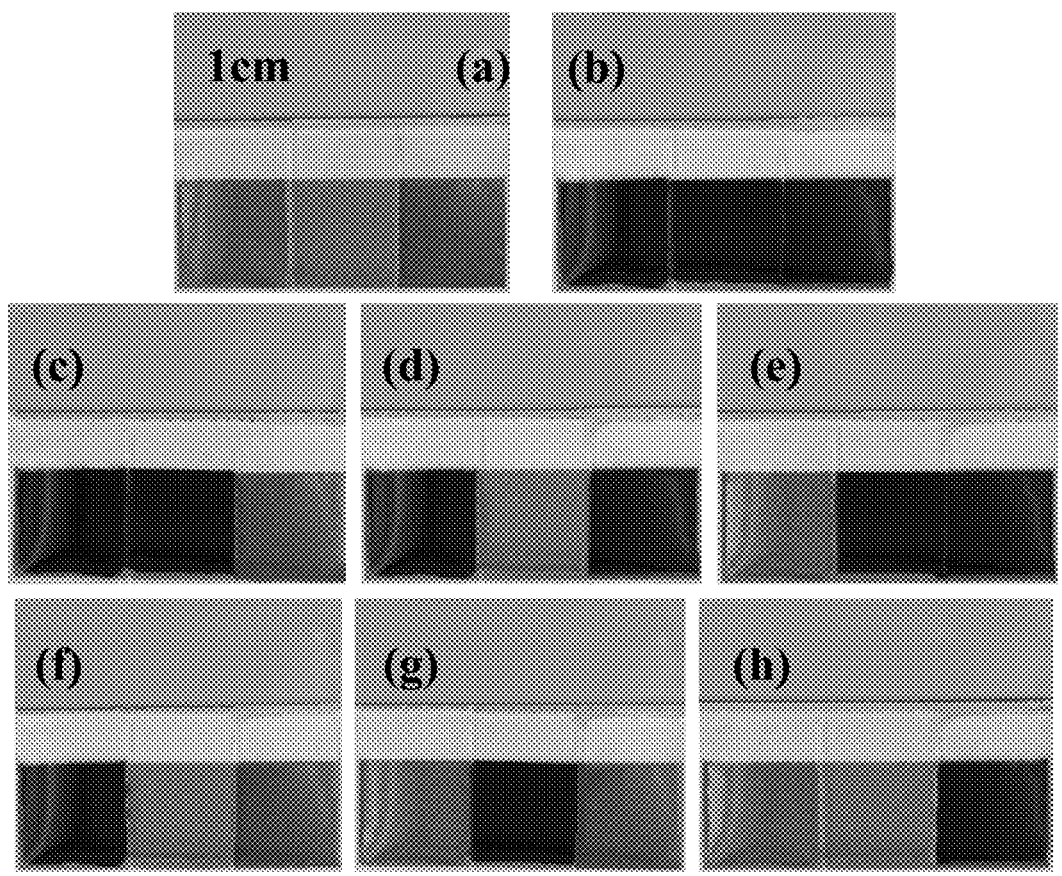
FIG. 8 is a set of photos of eight different states of the electrochromic device with side-by-side structure according to Embodiment 4 in operation.

Please refer to FIG. 8, which is a set of photos of eight different states of the electrochromic device with side-by-side structure of this embodiment during operation. Among them, FIG. 8(a) is a photo when the three color-changing layers are in a transparent state; FIG. 8(b) is a photo when the three color-changing layers are in a coloring state; FIG. 8(c) is a photo when the color-changing layer 33-1 and the color-changing layer 33-2 are in a coloring state, and the color-changing layer 33-3 is in a transparent state; FIG. 8(d) is a photo when the color-changing layers 33-1 and 33-3 are in a coloring state, and the color-changing layer 33-2 is in a transparent state; and FIG. 8(e) is a photo when the color-changing layers 33-2 and 33-3 are in a coloring state, and the color-changing layer 33-1 is in a transparent state; FIG. 8(f) is a photo when the color-changing layer 33-1 is in a coloring state, and the color-changing layers 33-2 and 33-3 are in a transparent state; FIG. 8(g) is a photo when the color-changing layer 33-2 is in a coloring state, and the color-changing layers 33-1 and 33-3 are in a transparent state; FIG. 8(h) is a photo when the color-changing layer 33-3 is in a coloring state, and the color-changing layers 33-1 and 33-2 are in a transparent state.

Users can adjust the three color-changing units to eight different combinations of states, the control methods include but not be limited to the following:

(1) When no working voltage is applied, the color-changing layers of the three color-changing units are in an initial transparent state, displaying R color area, G color area, and B color area, as shown in FIG. 8(a).

(2) Connect the positive electrode of the external circuit to the lead electrode 44 and the negative electrode of the external circuit to the lead electrodes 34 of any two color-changing units, that is, apply a working voltage of 1~3V from the electrode layer of the common electrode unit 40 to the transparent conductive layers of the two color-changing units, so that the color-changing layers of the two color-changing units are coloring and only the color area corresponding to the remaining color-changing layers is displayed, as shown in FIGS. 8(c) to (e).

(3) Connect the positive electrode of the external circuit to the lead electrode 44 and the negative electrode of the external circuit to the lead electrode 34 of any color-changing unit, that is, apply a working voltage of 1~3V from the electrode layer of the common electrode unit 40 to the transparent conductive layer of the color-changing unit, so that the color-changing layer of the color-changing unit is coloring, and only two color areas other than the color area corresponding to the color-changing layer are displayed, as shown in FIGS. 8(f) to (h).

(4) Connect the positive electrode of the external circuit to the wire electrode 44 and the positive electrode of the external circuit to the lead electrode 44 and the negative electrode of the external circuit to the lead electrodes 34 of the three color-changing units, that is, apply a working voltage of 1~3V from the electrode layer of the common electrode unit 40 to the transparent conductive layers of the three color-changing units, so that the color-changing layers of the three color-changing units are coloring and the R color area, G color area, and B color area are not displayed, as shown in FIG. 8(b).

(5) Connect the negative electrode of the external circuit to the lead electrode 44 and the positive electrode of the external circuit to the lead electrode 34 of any one or more than one color-changing units, that is, apply a working voltage from the transparent conductive layer of the color-changing unit to the electrode layer of the common electrode unit 40, so that the color-changing layer of the color-changing unit fades to a transparent state and the color area corresponding to the color-changing unit is displayed.

The electrochromic device with side-by-side structure of this embodiment may be used as a basic unit for array splicing, and then a color display can be obtained. The color display includes at least one such electrochromic device with side-by-side structure.

Thus, a large area of flexible color static display can be realized by array splicing of a plurality of the electrochromic devices with side-by-side structure.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed:

1. An electrochromic device with side-by-side structure, comprising:
    a common electrode unit, comprising an electrode layer and an electrode protection layer disposed on the electrode layer;
    at least one color-changing unit, comprising a transparent conductive layer and a color-changing layer disposed on the transparent conductive layer; wherein the common electrode unit and each color-changing unit are arranged on the same plane with an insulating region between two adjacent units; and an electrolyte layer, covering the electrode protection layer of the common electrode unit and the color-changing layer of each color-changing unit, and connecting the electrode protection layer of the common electrode unit and the color-changing layer of each color-changing unit;

wherein the electrode protection layer is made of a material capable of blocking discoloration ions from bombarding the electrode layer.

2. The electrochromic device of claim 1, wherein when the electrochromic device is working, a working voltage is applied between the electrode layer of the common electrode unit and the transparent conductive layer of at least one color-changing unit to achieve color change of the color-changing layer of the at least one color-changing unit; alternatively, a working voltage is applied between the transparent conductive layers of at least two color-changing units to achieve color change switching between the color-changing layers of the at least two color-changing units.

3. The electrochromic device of claim 2, wherein the color-changing layer is made of an electrochromic material.

4. An electrochromic apparatus, comprising at least one electrochromic device of claim 2.

5. The electrochromic apparatus of claim 4, wherein the electrochromic apparatus is an electrochromic dimming window, a display device or an encryption device.

6. The electrochromic device of claim 1, wherein the common electrode unit further comprises a substrate and the electrode layer is disposed on the substrate; the color-changing unit further comprises a transparent substrate and the transparent conductive layer is disposed on the transparent substrate.

7. The electrochromic device of claim 6, wherein the substrate of the common electrode unit and the transparent substrate of each color-changing unit share the same substrate.

8. The electrochromic device of claim 6, wherein the color-changing layer is made of an electrochromic material.

9. An electrochromic apparatus, comprising at least one electrochromic device of claim 6.

10. The electrochromic apparatus of claim 9, wherein the electrochromic apparatus is an electrochromic dimming window, a display device or an encryption device.

11. The electrochromic device of claim 1, further comprising a transparent encapsulation layer covering the electrolyte layer.

12. An electrochromic apparatus, comprising at least one electrochromic device of claim 11.

13. The electrochromic device of claim 1, wherein in the common electrode unit, the electrode layer is partially covered by the electrode protection layer, and an uncovered area of the electrode layer is provided with a lead electrode electrically connected with the electrode layer; in the color-changing unit, the transparent conductive layer is partially covered by the color-changing layer, and an uncovered area of the transparent conductive layer is provided with a lead electrode electrically connected with the transparent conductive layer; neither the lead electrode of the common electrode unit nor the lead electrode of each color-changing unit is in contact with the electrolyte layer.

14. The electrochromic device of claim 1, wherein the color-changing layer is made of an electrochromic material.

15. An electrochromic apparatus, comprising at least one electrochromic device of claim 1.

16. The electrochromic apparatus of claim 15, wherein the electrochromic apparatus is an electrochromic dimming window, a display device or an encryption device.

* * * * *